(12) United States Patent
Massanell et al.

(10) Patent No.: US 10,245,728 B2
(45) Date of Patent: Apr. 2, 2019

(54) MONITORING SYSTEM

(75) Inventors: Javier Massanell, Markdorf (DE);
Thomas May, Constance (DE);
Manfred Strobel, Weingarten (DE)

(73) Assignee: PMDTECHNOLOGIES AG, Siegen (DE)

( * ) Notice: Subject to any disclaimer, the term of this patent is extended or adjusted under 35 U.S.C. 154(b) by 1629 days.

(21) Appl. No.: 13/579,576

(22) PCT Filed: Feb. 21, 2011

(86) PCT No.: PCT/EP2011/052502
§ 371 (c)(1),
(2), (4) Date: Aug. 17, 2012

(87) PCT Pub. No.: WO2011/104199
PCT Pub. Date: Sep. 1, 2011

(65) Prior Publication Data
US 2012/0327190 A1    Dec. 27, 2012

(30) Foreign Application Priority Data
Feb. 23, 2010   (DE) .................. 10 2010 002 250

(51) Int. Cl.
*B25J 9/16* (2006.01)

(52) U.S. Cl.
CPC ... *B25J 9/1676* (2013.01); *G05B 2219/39387* (2013.01); *G05B 2219/40202* (2013.01); *G05B 2219/40203* (2013.01)

(58) Field of Classification Search
USPC ........................................................ 348/46
See application file for complete search history.

(56) References Cited

U.S. PATENT DOCUMENTS

| | | | |
|---|---|---|---|
| 6,587,186 B2 | 7/2003 | Bamji et al. | |
| 7,863,780 B2 | 1/2011 | Plasberg et al. | |
| 8,107,058 B2 | 1/2012 | Stein et al. | |
| 2001/0041077 A1* | 11/2001 | Lehner et al. | 396/661 |
| 2009/0316135 A1* | 12/2009 | Stein et al. | 356/27 |

FOREIGN PATENT DOCUMENTS

| | | |
|---|---|---|
| DE | 19704496 A1 | 3/1998 |
| DE | 10216023 A1 | 11/2003 |
| DE | 10320343 A1 | 12/2004 |
| DE | 102005003827 A1 | 7/2006 |
| DE | 102007013299 A1 | 9/2008 |

(Continued)

OTHER PUBLICATIONS

European Patent Office, International Search Report in International Patent Application No. PCT/EP2011/052502 (dated Jul. 15, 2011).

*Primary Examiner* — Michael E Teitelbaum
(74) *Attorney, Agent, or Firm* — Leydig, Voit & Mayer, Ltd.

(57) ABSTRACT

A monitoring system includes at least one three-dimensional (3D) time-of-flight (TOF) camera configured to monitor a safety-critical area. An evaluation unit is configured to activate a safety function upon an entrance of at least one of an object and a person into the monitored area and to suppress the activation of the safety function where at least one clearance element is recognized as being present on the at least one of the object and the person.

9 Claims, 3 Drawing Sheets

(56) References Cited

FOREIGN PATENT DOCUMENTS

| | | |
|---|---|---|
| DE | 102009046107 A1 | 5/2011 |
| EP | 1777747 A1 | 4/2007 |
| EP | 1785237 A2 | 5/2007 |
| EP | 1914609 A1 | 4/2008 |
| WO | WO 2006049554 A1 | 5/2006 |
| WO | WO 2007085330 A1 | 8/2007 |

* cited by examiner

MONITORING SYSTEM

CROSS-REFERENCE TO PRIOR APPLICATION

This application is a U.S. National Phase application under 35 U.S.C. § 371 of International Application No. PCT/EP2011/052502, filed on Feb. 21, 2011, and claims benefit to German Patent Application No. DE 10 2010 002 250.0, filed on Feb. 23, 2010. The International Application was published in German on Sep. 1, 2011 as WO 2011/104199 under PCT Article 21(2).

FIELD

The invention relates to a monitoring system including a three-dimensional (3D) time-of-flight (TOF) camera and to a corresponding method for monitoring an area.

BACKGROUND

German patent DE 10 2005 003 827 B4 describes a device and a method for interaction between a person and a robot unit at a robot workplace, wherein the approach of a person is monitored with respect to two safety thresholds. A first sensor unit detects that a person is approaching the workplace; the detection is done in such a way that a first signal is generated if a first safety distance is breached, and a second signal is generated if a second safety distance is breached. After the first signal has been triggered, it is provided that the robot unit is switched to a predefinable state, to a so-called safe operating stop. After the second signal has been triggered, the robot unit is switched to a so-called emergency-off state in the which the robot unit remains motionless in its momentary position. It is also provided that an additional safety switch that switches the robot unit to the safe operating stop state is arranged at the workplace of the robot unit.

German patent DE 103 20 343 B4 discloses a method for monitored cooperation between a robot unit and a person in which, according to a predefinable program sequence, handling steps are carried out in a shared workspace that is accessible to the robot unit as well as to the person. Here, it is provided that, as the robot approaches the person, a pattern of movement is communicated to the robot unit, and this pattern is characterized by the direction of movement, the speed of movement as well as the distance of the robot unit with respect to the person. A person-specific pattern of movement is selected from a plurality of different stored patterns of movement, so that the person is given a feeling of safe working conditions as well as of control over the robot unit. Each pattern of movement is present in at least a first quality level and a second quality level that differ from each other, for instance, in terms of their speed of movement and/or direction of movement. Taking into consideration the momentary braking distance of the robot unit as well as the maximum speed of movement of the person, the robot unit is braked or brought to a standstill until there is no longer a risk of collision.

Likewise known from the state of the art are systems for three-dimensional image detection that operate with the aid of active illumination. These include TOF or transit time measuring systems. These systems employ amplitude-modulated or pulsed light for purposes of illuminating the three-dimensional scene that is to be detected.

The terms camera or camera system are meant to encompass all 3D TOF camera systems that acquire transit time information from the phase shift of radiation that has been emitted and received. Suitable 3D TOF cameras are especially photonic mixer device (PMD) cameras having PMD detectors of the type described in German application DE 196 35 932, European patent application EP 1 777 747, U.S. Pat. No. 6,587,186 as well as German patent application DE 197 04 496; these cameras can be obtained from the IFM ELECTRONIC GMBH company under model name FRAME GRABBER O3D101/M01594. In particular, the PMD camera allows a flexible arrangement of the source of light and the detector, which can be installed either in a housing or else separately.

SUMMARY

In an embodiment, the invention provides a monitoring system including at least one 3D TOF camera configured to monitor a safety-critical area. An evaluation unit is configured to activate a safety function upon an entrance of at least one of an object and a person into the monitored area and to suppress the activation of the safety function where at least one clearance element is recognized as being present on the at least one of the object and the person.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the invention makes it easier for certain objects to enter or be brought into a monitoring area.

Advantageously, the monitoring system according to an embodiment of the invention provides at least one 3D TOF camera for monitoring an area, especially a safety-critical area. The monitoring system comprises an evaluation unit that activates a safety function when an object enters the monitored area. The evaluation unit is configured in such a way that the activation of the safety function does not take place if clearance elements are recognized on the entering object.

This approach has the advantage that objects that are supposed to enter and are authorized to enter a certain area are unambiguously recognized by the monitoring system, and their entry is permitted in that the safety function is not activated for these objects.

Advantageously, a method for operating such an area monitoring system is likewise provided according to an embodiment of the invention.

In an embodiment, a clearance element is configured as a marking having at least one specified optical and/or geometrical property.

Thanks to this approach, it is advantageously accomplished that the objects that are to be cleared have markers that can be unambiguously identified by the 3D TOF camera on the basis of their optical and/or geometrical properties. Reflectors that have a certain size, shape and/or reflectivity are especially well-suited for this purpose. When an object having such a reflector enters a defined sector of the monitored area, the safety function of the monitoring system can be reliably bridged.

It is likewise advantageous for the monitored area to be marked at least partially or else completely by marking elements having at least one defined optical property. Such areas can be delimited, for example, by means of reflectors or reflective adhesive tape. In this manner, it is easily possible to already detect the entry of an object by sensing a change in reflectivity.

In another embodiment, it is provided that the entry of an object can be recognized on the basis of a change in distance and/or a change in an optical property.

In a practical manner, the system is also configured in such a way that, when an object enters the monitoring area, a safety function is only triggered if no clearance elements are recognized on the entering object.

It is also provided for a clearance area to be defined within the boundaries of the monitored area, whereby the suppression of the safety function on the basis of clearance elements is only permitted for the clearance area. Thanks to this approach, it is advantageously possible to create different safety areas within a monitored area.

Preferably, the clearance area is also marked by means of optical markings, either completely, partially or else only along its boundaries.

Figure 1:
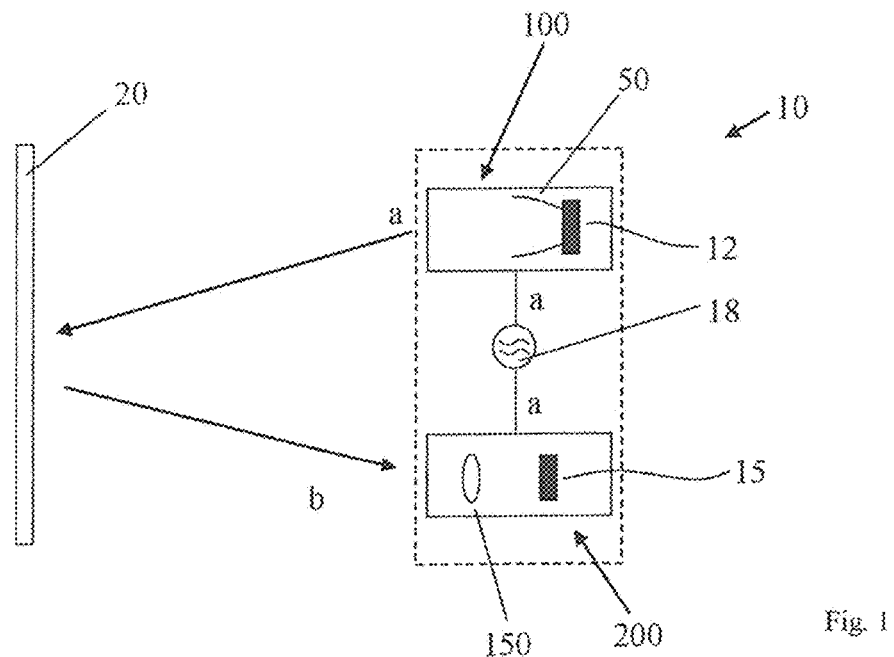
FIG. 1 shows a 3D TOF camera system in schematic view.

FIG. 1 shows a measuring situation for an optical distance measurement using a 3D TOF camera system of the kind known, for example, from DE 197 04 496.

The 3D TOF camera system here comprises a transmitting unit or an illumination module 100 having a light source 12 and an appertaining beam-forming lens 50 as well as a receiving unit or 3D TOF camera 200 with a receiving lens 150 and a photo sensor 15. The photo sensor 15 is preferably configured as a pixel array, especially as a PMD sensor. The receiving lens typically consists of several optical elements for purposes of improving the imaging properties. The beam-forming lens 50 of the emitting unit 100 is preferably configured as a reflector. However, diffractive elements or combinations of reflective and diffractive elements can also be employed.

The measuring principle of this arrangement is based essentially on the fact that the transit time of the emitted and reflected light can be ascertained on the basis of the phase difference between the emitted and the received light. For this purpose, a certain modulation frequency with a first phase relation a is applied to the light source as well as to the photo sensor 15 by means of a modulator 18. Corresponding to the modulation frequency, the light source 12 emits an amplitude-modulated signal having the phase a. In the case presented here, this signal or the electromagnetic radiation reflects off an object 20 and, due to the distance it has traveled, strikes the photo sensor 15 accordingly phase-shifted with a second phase relation b. In the photo sensor 15, the signal of the first phase relation a of the modulator 18 is mixed with the received signal—which in the meantime, has acquired a second phase relation b—and the phase shift or the object distance is determined on the basis of the resulting signal.

Figure 2:
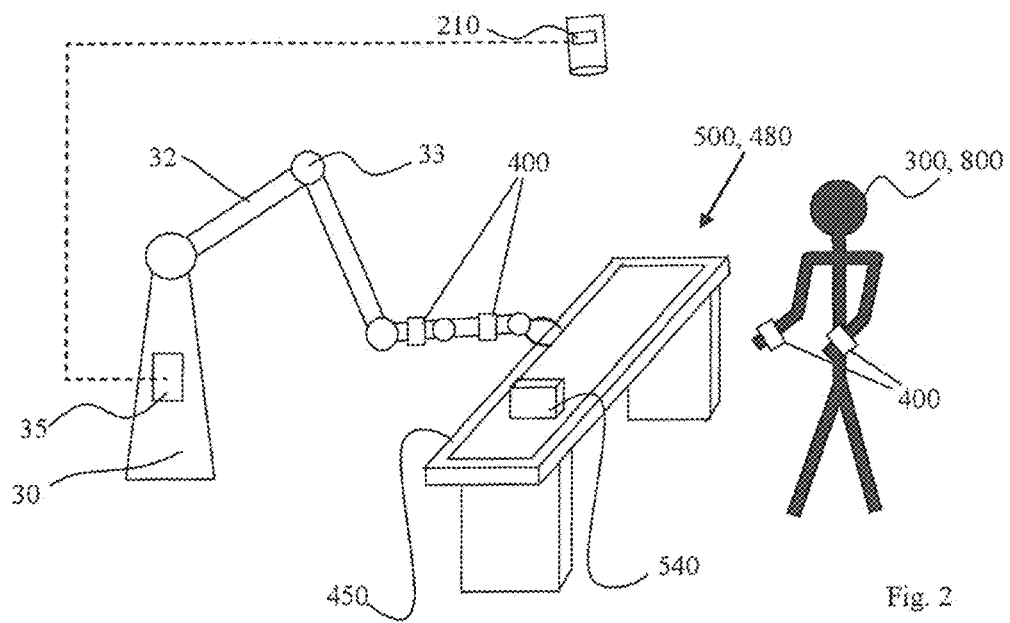
FIG. 2 shows a monitoring system according to an embodiment of the invention for a machine work area.

FIG. 2 schematically shows a machine workplace 500 with a robot 30 and a person 300. The robot 30 is configured here as a gripping robot or a tool robot that has a control unit 35 and that is equipped with several articulated arms 32 and articulations 33. Between the person 300 or the entering object 800 and the robot 30, there is a workplace 500 that is shared, preferably cooperatively, by the person 300 and the robot 30.

The entire situation in which the robot 30 and the person 300 are present is monitored by a 3D TOF camera 10. Moreover, the 3D TOF camera 10 is in communication with the control unit 35 of the robot 30.

The edge of the work area 500, which should also be a monitoring area 480, is provided with an optical marking 450 along the periphery. The optical marking 450 is preferably configured as a reflector tape. The essential factor for the optical marking 450 is that it has an optical property that can be securely and reliably recognized by the monitoring system.

It is also possible to define a larger or smaller monitoring area 480 starting at the optical marking 450. Moreover, the monitoring area is not restricted to a two-dimensional extension, but rather, can also be defined three-dimensionally with any desired geometry. The optical marking 450 of the area essentially serves as a position reference for defining the monitoring area 480.

The parameters for defining such a monitoring area can be stored, for example, in an evaluation unit of the monitoring system. In the example shown, such an evaluation unit 210 is integrated into the 3D TOF camera 10. A separate arrangement in a control unit is provided in accordance with an alternate embodiment. Moreover, the evaluation unit 210 preferably has an imaging processing unit or is in communication with such a unit, thus especially allowing object recognition.

In the case presented here, the person 300 is still outside of the monitoring area 480. The person 300 is wearing optical clearance elements 400 that are visible on his or her arms. Since the person 300 is outside of the secured work area, the clearance elements 400 are at first ignored by the monitoring system.

Only when the person 300 enters the monitored area 480 is a safety function of the monitoring system suppressed on the basis of the recognized clearance elements 400. Optionally, the suppression or muting of the safety function can be made available as a signal for another application.

If no clearance element is recognized, the safety function is activated when a person or an object enters the area. In this context, the safety function can be configured in many different ways, for instance, by emitting a safety alarm, whereby the alarm can preferably be further processed by other devices.

In the embodiment shown, when a safety function has been activated, the evaluation unit 210 transmits an alarm to the control unit 35 of the robot 30. In response to such an alarm, the control unit 35 intervenes in the robot functions and safely brings the robot to a standstill, so as to rule out any risks to a person who is entering without authorization.

The recognition of a clearance element 400 is not necessarily restricted to the point in time of entry. Since the detection area of the 3D TOF camera 10 typically extends beyond the monitoring area 480 that is to be secured, a person or an object can already be detected as they approach the area. For instance, it can already be checked in advance whether the approaching person or object 800 has the requisite clearance elements 400. Optionally, if no clearance elements 400 are present, a preliminary alarm can be triggered in order to inform the approaching person, for example, about the absence of the clearance elements 400.

Furthermore, the robot 300 also has optical clearance elements 400 on its gripping arms to suppress or mute a safety function of the monitoring system. The optional use of clearance elements 400 on machine parts is primarily to be seen as a diversified and redundant safety measure. In principle, the movement and the position of a robot 30 or articulated arm 32 can already be ascertained on the basis of the control data and/or on the basis of the position sensors of the robot 30. This can be done redundantly by the evaluation unit 210 on the basis of the clearance elements 400 arranged on the robot arm. On the one hand, owing to the fact that the clearance elements have been recognized, permission to enter the monitored area 480 is granted and, on the other hand, the system is aware of the position of the clearance elements and thus also of the position of the robot arm.

The clearance elements 400 present on persons 300 differ optically and/or geometrically from the clearance elements present on machines and/or objects so that they can be better distinguished.

In addition, it can also be provided that different tool heads are fitted with different clearance elements. In this manner, it is possible, for example, to prevent the use of the wrong tool head for a given process.

Moreover, it can also be provided that the robot arm is only cleared to move in certain sectors of the work area.

Furthermore, in an embodiment, a work material 540 without optical clearance elements is present inside the monitoring area 480, without a safety function being or having been activated. Fundamentally, the monitoring system can be configured in such a manner that objects that are already present inside the monitored area or that were brought into the monitored area after being granted entry are considered to be safety-uncritical. It is likewise conceivable that, aside from the clearance by means of clearance elements 400, clearance can also be granted by means of object recognition.

In another embodiment, for purposes of better recognition of the extremities of the person 300, additional optical clearance elements 400 or marking means are arranged at specific areas of the body such as the head, shoulders, wrists, elbows, knees as well as in the area of the feet.

The situation detected by the 3D TOF camera can also be evaluated especially in terms of the position and movement of the person 300. Even though the person 300 wearing the appropriate clearance elements 400 is fundamentally permitted to enter the monitored and typically safety-critical area 480, depending on the location, movement and/or position of the person 300, a safety-critical situation can arise vis-à-vis the robot or the machine system. The 3D TOF camera 10 or the evaluation unit 210 is preferably configured in such a manner that, depending on the recognized spatial data of the person 300 relative to the known position and movement plans of the robot, a safety-critical position of the person 300 can be recognized and prevented. In order to reduce or, if applicable, even avert the risk to the person, it can be provided that, for instance, the speed of the robot articulations or arms 32 is reduced during the approach, so that it can be ensured that the robot arm 32 can always be safely brought to a standstill.

During a cooperative interaction between the person 300 and the robot 30, the person 300 is expected to make predetermined patterns of movement. If the person 300 is working within these patterns of movement, the machine maintains the cooperative process sequence. However, if the person 300 deviates from this process sequence, the machine goes into a safety mode, if applicable, or evades the movements of the person 300.

Particularly with an eye towards a cooperative process sequence, it can be provided that the maximum speed of the robot is selected in such a manner that the robot comes to a standstill inside a prescribed safety margin in case of danger. For instance, it can be provided that the speed of the robot is reduced as the distance between the person 300 and the robot 30 diminishes.

Figure 3:
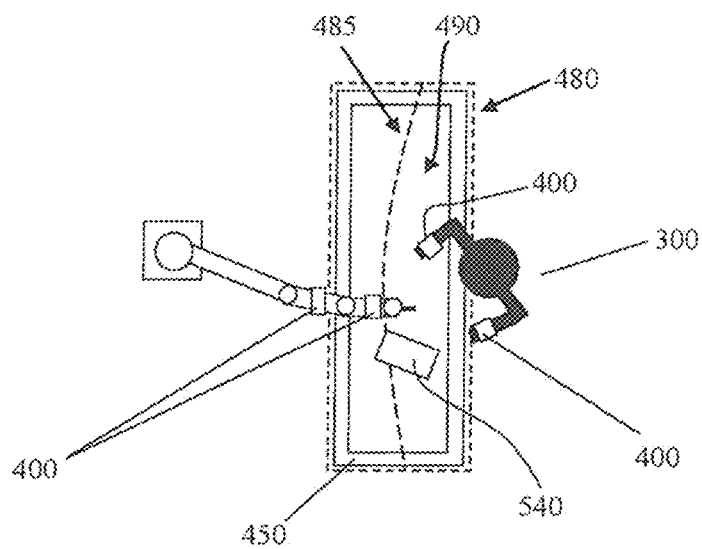
FIG. 3 shows a top view of the machine work area.

FIG. 3 schematically shows the interactive situation in a top view. In the depiction, the person 300 is at the machine workplace 500 and, in a cooperative interaction, can make the work means 540 situated on the workplace 500 available to the robot 30.

The right arm of person 300 on which there is a clearance means 400 has entered the monitored area 480. According to an embodiment of the invention, the safety function for the monitored area 480 is suppressed due to the recognized clearance means 400, so that the cleared person can now freely move inside the monitored safety-critical area.

In the case shown here, however, it is additionally provided for the clearance or the suppression of the safety function to only remain active up to a clearance boundary 485. Thus, in this example, entry by the person 300 is only allowed from the side across from the robot and only up to the clearance boundary 485. If any part of the body of person 300 crosses the clearance boundary 485, the safety function is activated in spite of the recognized clearance elements 400, that is to say, in the present example, the robot 30 is brought to a standstill. If the robot application is considered to be safety-uncritical, then it is optionally possible to dispense with a clearance boundary 485 and the person 300 is cleared for the entire monitoring area 480, in other words, the safety function is suppressed for the entire monitoring area 480.

By means of this approach, as a function of the application and the desired level of safety, a clearance area or clearance space 490 can be defined that extends either over the entire monitored area 480 or over an area restricted by a clearance boundary 485.

In order to increase the safety of the interacting person, a clearance boundary can be provided that relates to the robot itself, namely, a so-called machine clearance boundary. A safety function is activated if the robot 30 crosses this boundary owing to a malfunction.

In the case shown here, the work area to be secured is monitored by a single 3D TOF camera 10. Of course, it is also possible to monitor the area with several 3D TOF cameras 10, so that even hidden areas or information can advantageously be detected redundantly.

In the example given here, the entire edge area of the field to be secured is provided with optical markings, although it is also possible to mark only individual sectors or especially critical areas. It is particularly advantageous for the clearance area 490 to have an optical property that differs from that of the rest of the safety area. This allows a very fast and reliable detection of an object that enters the safety area that has not been cleared. It is likewise conceivable to mark only the boundaries of the clearance area 490.

The marking of the area to be monitored with marking elements having a known optical property makes it possible to recognize the background very reliably and especially also in a diversified manner, for instance, by ascertaining the distance and reflectivity of the marking means. Entry by an object or person can then usually be recognized on the basis of a change in distance or a change in reflectivity. Furthermore, the direction of movement and the speed of movement can be ascertained on the basis of the 3D data and of the image flow in the amplitude image of the 3D camera.

Figure 4:
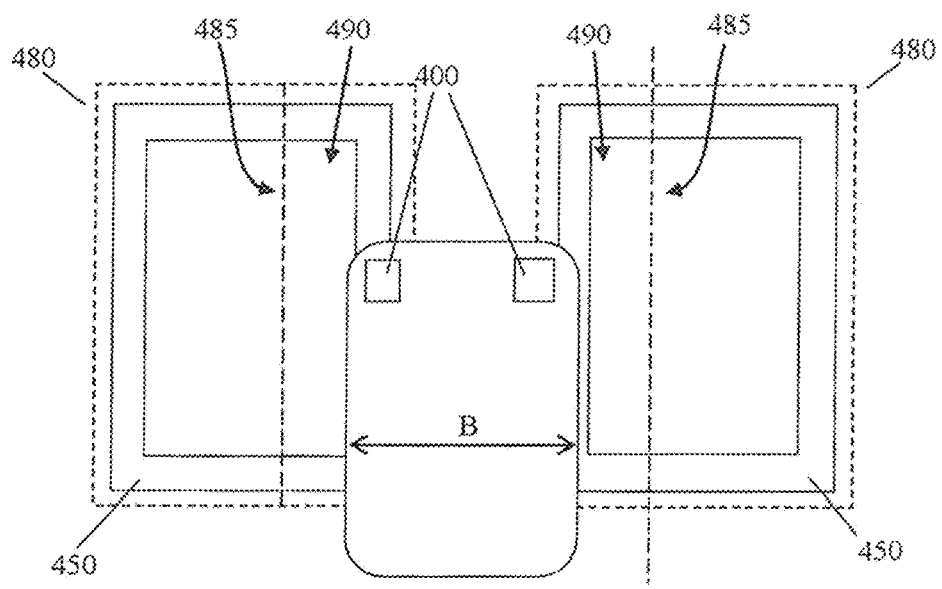
FIG. 4 shows an object entering two monitored areas.

FIG. 4 shows a typical situation in manufacturing, for instance, a car-production line. Optical markings 450 serve to indicate a safety area 480 on the left side as well as on the right side. The object 530, for instance, a car, enters the left and right sides of the safety area 480, or else the clearance area 490, within the clearance boundaries 485. Due to the optical clearance elements 400 on the object 530, the monitoring system suppresses the safety function for this object. As an alternative to a clearance element 400 additionally installed on the object, it is especially possible in the case of a vehicle to utilize a vehicle part having a special optical property, for example, a headlight reflector, as the clearance element.

Depending on the desired level of safety, the monitoring system can either clear only the entering object 530, 800 or, optionally can also clear the entire clearance space 490. If the entire clearance space 490 is cleared, persons as well as other objects can be active inside the clearance space 490 as long as the cleared object 530, 800 is inside the cleared space 490. Once the cleared object 530, 800 leaves the secured or monitored area 450, the suppression of the safety function is once again canceled.

If, for the sake of a higher level of safety, it is desirable for only the object 530 to be cleared, then the dimensions of the object to be cleared should preferably be stored in the monitoring system or in the evaluation unit 210. In the present case, these dimensions are, for instance, the width B and/or the length L of the object 530, 800. If another object without a clearance element 400 enters the monitored area 480 or the clearance space 490, a safety function is activated.

Figure 5:
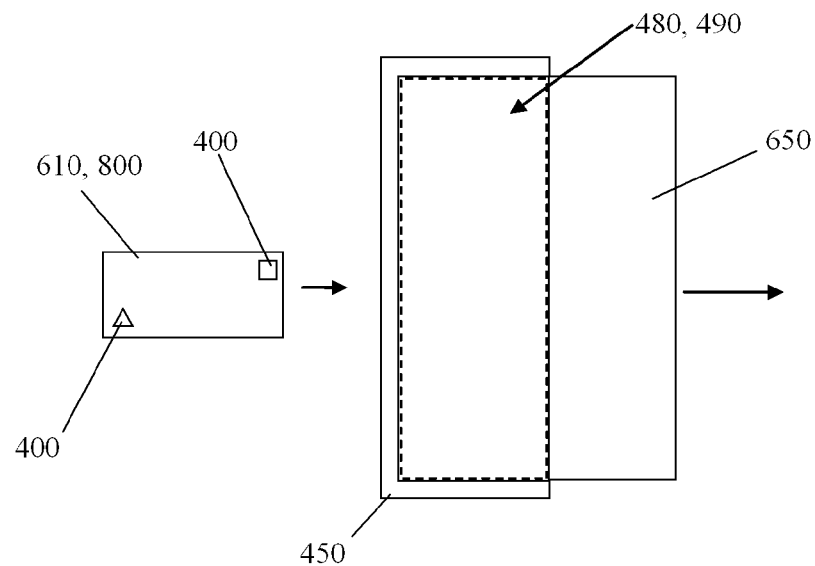
FIG. 5 shows fitting a machine with a workpiece carrier.

FIG. 5 shows the process of fitting a machine 650 with a workpiece carrier 610. The safety-critical area of the machine 650 is surrounded on three sides by optical markings 450. The workpiece carrier 610 is provided with optical clearance elements 400 on two opposite corners. The clearance elements in the example given here have a different geometrical shape so that not only the clearance, but also a correct positioning of the workpiece carrier 610 can be recognized. On the basis of the optical clearance elements 400, for instance, its is also possible to optically encode various workpiece carriers, so that, for instance, the monitoring system only allows certain workpiece carriers for the machine 650.

Figure 6:
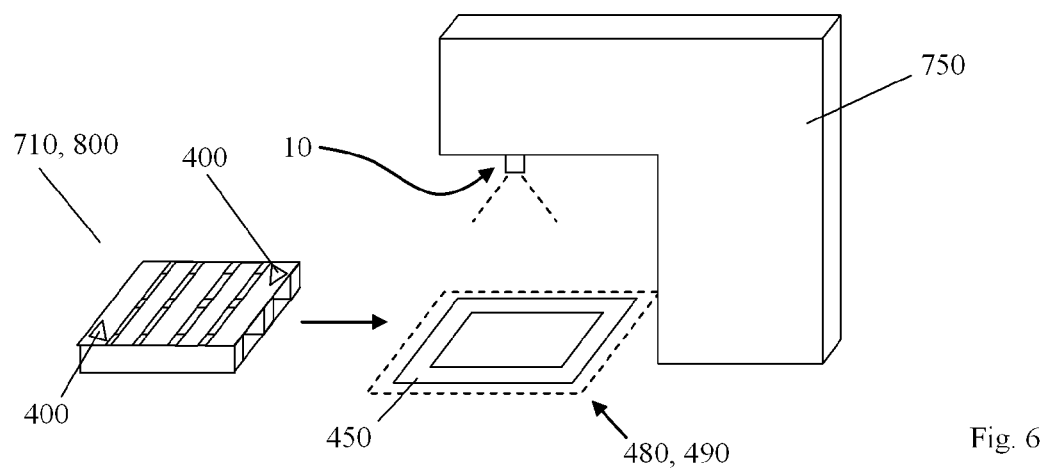
FIG. 6 shows providing a pallet in a monitored area.

FIG. 6 shows the provision of a material pallet 710 in a monitored area 480. Here, a 3D TOF camera 10 is arranged on one arm of the manufacturing machine 750, said camera monitoring the safety area marked with the optical marking means 450. The area 480 that is to be monitored is slightly larger than the area defined by the optical markings 450. The muting function, that is to say, the suppression of the safety function on the basis of clearance elements 400, should extend here over the entire monitored area. Therefore, the clearance area 490 matches the monitored area 480. In the example given, it is provided that the pallet 710 is made available to the machine 450 inside the safety area 480. In order to suppress the safety function, the pallet 710, in other words, the entering object 800, has appropriate optical clearance elements 400 on two corners.

Aside from the clearance of the provided pallet 710, after the pallet 710 has been put in place, it is also possible to check whether the pallet is removed without authorization.

In the case presented here, the pallet 710 can serve to receive finished products that are to be subsequently transported away. In this context, the monitoring can be configured in such a way that, by covering the pallet 710 and thus also the clearance elements 400 with the products to be transported, the pallet 710 is recognized as having been filled, and a signal to this effect is generated. Such an embodiment has the advantage that it is possible to ascertain not only the clearance but also whether products to be transported have been placed onto the pallet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. An incomplete list of applications especially includes conceivable applications in area monitoring, alarm systems, warehousing systems, traffic systems and other applications.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A monitoring system, comprising:
at least one three-dimensional (3D) time-of-flight (TOF) camera configured to monitor a safety-critical area;
an evaluation unit configured to activate a safety function upon an entrance of at least one of an object and a person into the monitored area and to suppress the activation of the safety function where at least one clearance element is recognized as being present on the at least one of the object and the person, the at least one clearance element including a marking that is detectable by the at least one 3D TOF camera and identifies the at least one clearance element based on at least one of a specified optical property and a specified geometrical property of the marking.

2. The system according to claim 1, wherein the system is configured to distinguish between clearance elements for the object and for the person based on respective markings thereof which differ from each other in at least one of an optical and a geometrical manner.

3. The system according to claim 1, further comprising marking elements disposed so as to at least partially mark the area, the marking elements having at least one defined optical property.

4. The system according to claim 1, wherein the system is configured to recognize the entrance of the at least one of the object and the person based on a change in at least one of a distance and an optical property being detected by the at least one 3D TOF camera.

5. The system according to claim 1, wherein the system is configured to monitor a clearance area that is defined within the boundaries of the area and wherein the evaluation unit is configured to suppress the activation of the safety function only where the at least one clearance element is recognized as being present on the at least one of the object and the person in the clearance area.

6. The system according to claim 5, further comprising optical markings disposed so as to at least partially mark a boundary of the clearance area.

7. A method for operating an area monitoring system comprising:

- monitoring an area using a three-dimensional (3D) time-of-flight (TOF) camera;
- using the 3D TOF camera, detecting when at least one of a person and an object enters the area;
- using an evaluation unit, recognizing whether at least one clearance element is present on the at least one of the person and the object, the at least one clearance element being recognized by a marking thereof which identifies the at least one clearance element based on at least one of a specified optical property and a specified geometrical property of the marking; and
- activating a safety function when the at least one of the person and the object enters the area only in a case where the recognizing results in a determination that the at least one clearance element is not present.

8. The method according to claim 7, wherein the area is a safety-critical area.

9. The method according to claim 7 further comprising distinguishing between clearance elements for the object and for the person based on respective markings thereof which differ from each other in at least one of an optical and a geometrical manner.

* * * * *